US006101472A

United States Patent [19]
Giangarra et al.

[11] Patent Number: 6,101,472
[45] Date of Patent: Aug. 8, 2000

[54] DATA PROCESSING SYSTEM AND METHOD FOR NAVIGATING A NETWORK USING A VOICE COMMAND

[75] Inventors: Paul Placido Giangarra, Austin; James Lynn Taylor, Granger; William Joseph Tracey, II, Round Rock, all of Tex.

[73] Assignee: International Business Machines Corporation, Armonk, N.Y.

[21] Appl. No.: 08/842,720

[22] Filed: Apr. 16, 1997

[51] Int. Cl.$^7$ .................................................. G10L 15/22
[52] U.S. Cl. ............................................ 704/275; 704/270
[58] Field of Search ................................. 704/275, 270, 704/272, 200; 379/88.17, 88.22, 88.01

[56] References Cited

U.S. PATENT DOCUMENTS

| | | | |
|---|---|---|---|
| 5,363,322 | 11/1994 | Gergen et al. | 364/754 |
| 5,465,317 | 11/1995 | Epstein | 395/2.45 |
| 5,513,298 | 4/1996 | Stanford et al. | 395/2.52 |
| 5,543,789 | 8/1996 | Behr et al. | 340/995 |
| 5,572,643 | 11/1996 | Judson | 395/793 |
| 5,699,486 | 12/1997 | Tullis et al. | 704/270 |
| 5,708,764 | 1/1998 | Borrel et al. | 395/119 |
| 5,732,216 | 3/1998 | Logan et al. | 395/200.3 |
| 5,737,619 | 4/1998 | Judson | 395/761 |
| 5,774,859 | 6/1998 | Houser et al. | 704/270 |
| 5,799,063 | 8/1998 | Krane | 379/88.17 |
| 5,857,172 | 1/1999 | Rozak | 704/275 |
| 5,884,266 | 3/1999 | Dvorack | 704/275 |
| 5,893,063 | 4/1999 | Loats et al. | 704/275 |
| 5,897,618 | 4/1999 | Loats et al. | 704/275 |

OTHER PUBLICATIONS

IEEE Multimedia; Little et al, Speech–Aware multimedia; (Spring 1996) vol. 3, No. 1, p.74–8.
IEEE Multimedia. Hemphill et al., "Speech Aware Multimedia", pp. 74–78, vol. 3. Spring 1996.
Proc. Multimedia 95. Hemphill et al., "Surfing the Web by voice", pp. 215–222. 1995.
IEEE Multimedia. Hemphill et al., "Speech Aware Multimedia" pp. 74–78, vol. 3.
ACM Multimedia 95—Electronics Proceedings. Hemphill et al., "Surfing the Web by Voice", Nov. 1995.
Anderson, Julie, "Listen Up, Computer," Informationweek, Jun. 3, 1996.
DiDio, Laura, "OS/2 Warp to Use Voice–Activated Interface," Computerworld, vol. 30, No. 17, Apr. 22, 1996.
"New I.B.M. Software to Hear Commands," New York Times, Apr. 23, 1996.

*Primary Examiner*—Richemond Dorvil
*Attorney, Agent, or Firm*—Winstead Sechrest & Minick P.C.; Volel Emile

[57] ABSTRACT

A voice command interface in a data processing system and method are implemented to allow a user to speak a name of a link identified by Hypertext Markup Language (HTML) format to receive a desired web page from a communication network, such as the Internet. During operation of the data processing system and method for implementing the voice command interface, a client computer accesses a current web page using a server. When a new web page is accessed, a central processing unit in the data processing system provides control signals to a speech recognition unit to clear a vocabulary list currently stored within the speech recognition unit. Subsequently, the central processing unit commences to parse the HTML source code corresponding to the accessed web page. The central processing unit then determines whether the accessed web page has any links therein. If the web page does have links, the central processing unit detects those links during a parsing operation and enables the speech recognition unit to stored the text displayed to an external user which corresponds to the link in a special vocabulary list of the speech recognition unit. A user is then able to provide a voice command to access the link by speaking the text stored within the special vocabulary list. Upon speaking that text, the central processing unit accesses a web page corresponding to the link identified by the text.

32 Claims, 13 Drawing Sheets

```
<HTML>
<HEAD>
<TITLE>IBM Patent Server Home Page</TITLE>
<!-- Changed by: , 3-Jan-1997 -->
<META NAME="abstract" CONTENT="Patent Server Home page">
</HEAD>

<!-- Begin header -->
<BODY BACKGROUND=/images/bg.2.gif BGCOLOR=#FFFFCC TEXT=#150A00>

<TABLE BORDER=0 CELLPADDING=2 CELLSPACING=0 WIDTH=580>
<TR HEIGHT=103>
   <TD WIDTH=100><BR></TD> <!-- blank cell -->
   <TD WIDTH=437 ALIGN=LEFT VALIGN=TOP> <!-- Banner -->
   <IMG SRC="images/ibm.gif" ALIGN=TOP WIDTH="433" HEIGHT="239" BORDER="0"> <BR>
   </TD>
</TR>
<TR>
   <TD ROWSPAN=7 WIDTH=100 VALIGN=TOP ALIGN=LEFT> <!-- Navbar -->
   <FONT SIZE=2> <IMG SRC=/images/over_100.gif WIDTH=100 HEIGHT=1>
   <xA HREF="/ibm.html">Home</A><P>
   <A HREF="/help.html">Help</A><P>
   <A HREF="/boolquery.html">Search</A><P>
   <A HREF="/order">Order Form</A><P>
   <A HREF="/comment.html">Guestbook</A><P>
   <A HREF="/conditions.html">Legal</A><P>
   <A HREF="http://www.ibm.com">IBM</A><P>
   </FONT>
   </TD>
```

FIG. 5B

```
</TR>
<TR><TD COLSPAN=6>
    <BR CLEAR=ALL>
<!-- End header -->

<TABLE BORDER=0>
<TR VALIGN=TOP>
<TD WIDTH=60 ALIGN=right> 
<BR>
</TD>
<TD WIDTH="475">
<FONT SIZE="3">
<IMG SRC="images/w.gif" ALIGN=LEFT WIDTH="18" HEIGHT="44" BORDER="0" ALT="W">elcome to the IBM Patent Server.  With this World Wide Web server, IBM lets you access over 26 years of U.S. Patent & Trademark Office (USPTO) patent descriptions as well as <EM>the last seventeen years of <A HREF=image_s"/A> The first entries date back to January 5, 1971.  You can search, retrieve and study over two 500 million patents.  There is an <A HREF="/faq.html">FAQ</A> and information on the interesting history and background of this site.</A>

<HR NOSHADE SIZE=1 WIDTH=350>

<FONT COLOR=GREEN><A HREF="/whatsnew.html">NEW!<A> Seven more years of paten

</FONT>

<HR NOSHADE SIZE=1 WIDTH=350>
```

DATA PROCESSING SYSTEM AND METHOD FOR NAVIGATING A NETWORK USING A VOICE COMMAND

CROSS-REFERENCE TO RELATED APPLICATIONS

The present patent application is related to the following, co-pending and commonly assigned patent applications:

Ser. No. 08/812,888, entitled "A Data Processing System and Method for Switching Between Programs Having a Same Title Using a Voice Command," and Ser. No. 08/812,890, entitled "A Data Processing System and Method for Dynamically Accessing an Application Using a Voice Command,"

wherein each of the above-referenced patent applications was filed on Mar. 10, 1997.

TECHNICAL FIELD

The present invention relates in general to computer speech recognition, and in particular, to computer speech recognition in the context of a client browser operating in a computer network.

BACKGROUND INFORMATION

The worldwide network of computers commonly known as the "Internet" has seen explosive growth in the last several years. This growth has been fueled by the introduction and widespread use of web browsers which allow for simple graphical user interface-based access to network servers. In turn, the network servers support documents formatted as "web pages." The "WorldWide Web" (WWW) commonly used to refer to a collection of servers on the Internet that utilize a Hypertext Transfer Protocol (HTTP). HTTP is a known application protocol that provides users with access to files having a myriad of formats, such as text, graphics, sound, and video, among others, using a standard page description language known as Hypertext Markup Language (HTML). HTML provides basic document formatting and allows a developer to specify "links" to other servers and files. Use of an HTML-compliant client browser involves specification of a link via a Uniform Resource Locator (URL). Upon specifying a link via a URL, the client makes a tcp/ip request to the server identified in the link and receives a "web page" in return. It should be noted that the "web page" is a document formatted according to HTML.

In an attempt to make the graphical user interface associated with a web browser easier and more intuitive to a novice user of the Internet, a graphical user interface which responds to voice commands for accessing web pages from the World Wide Web has been implemented. For example, International Business Machines Corporation has implemented voice navigation for the World Wide Web in an OS/2 WebExplorer portion of its OS/2 Warp Version 4 operating system. Additionally, such voice navigation capability is available with the Netscape Navigator 2.02 for the OS/2 operating system. In the voice command interface utilized in the OS/2 operating system, a speaker's sound and language pattern are identified. Subsequently, the sounds detected by the computer system utilizing the OS/2 operating system convert the sounds into text. Therefore, by uttering a simple statement such as "Jump to x home page," the OS/2 operating system automatically accesses the World Wide Web and the web page desired by the user. However, the voice command interface of the OS/2 operating system requires the desired home page to be predefined. For example, the definition of the home page must be manually stored within a group of terms recognized by a speech recognition unit of the OS/2 operating system prior to execution of a voice command. See, "New I.B.M. Software to Hear Commands," *The New York Times,* Tuesday, Apr. 23, 1996.

Furthermore, even when the desired home page is accessed through a voice command, subsequent operations within the web page require a user to interface with the web page using more traditional techniques, such as a mouse or keyboard. Therefore, a neophyte user of a web page is not able to resort to the easily understandable and intuitive interface provided by a voice command interface. Therefore, a need exists for the user interface which provides an intuitive and easily usable interface for accessing information from a network of computers such as the World Wide Web.

SUMMARY OF THE INVENTION

The previously mentioned needs are fulfilled with the present invention. Accordingly, there is provided, in a first form, a data processing system. The data processing system includes a first input circuit for receiving a first user input and a second input circuit for receiving a first voice command. A central processing unit is connected to the first input circuit for receiving the first user input. The central processing unit performs a first operation in response to the first user input and identifies a first link value corresponding to the first user input. A speech recognition unit is connected to the central processing unit for accessing the first link value and for storing the first link value in a first memory. The speech recognition unit is connected to the second input means for receiving the first voice input. The speech recognition unit determines when the first voice command corresponds to the first link value.

Additionally, there is provided, in a second form, a method for accessing a communication network. The method includes the steps of receiving a first user input at a first user interface. A central processing unit is enabled to access a first application including a first text portion in response to the first user input. The first text portion is parsed to identify a first link corresponding to a second application. A first voice command is received at a second user input. A speech recognition unit is enabled to recognize the first voice command and to determine when the first voice command corresponds to the first link.

Furthermore, there is provided, in a third form, a program storage device, readable by a machine, tangibly embodying a program of instructions executable by the machine to perform method steps for accessing a data processing system. The method steps include receiving a first user input at a first user interface, enabling a central processing unit to access a first application including a first text portion in response to the first user input, and parsing the first text portion to identify a first link corresponding to a second application. Additionally, the method steps include receiving a first voice command at a second user interface and enabling a speech recognition unit to recognize the first voice command and to determine when the first voice command corresponds to the first link.

The foregoing has outlined rather broadly the features and technical advantages of the present invention in order that the detailed description of the invention that follows may be better understood. Additional features and advantages of the invention will be described hereinafter which form the subject of the claims of the invention.

DETAILED DESCRIPTION

Figure 1:
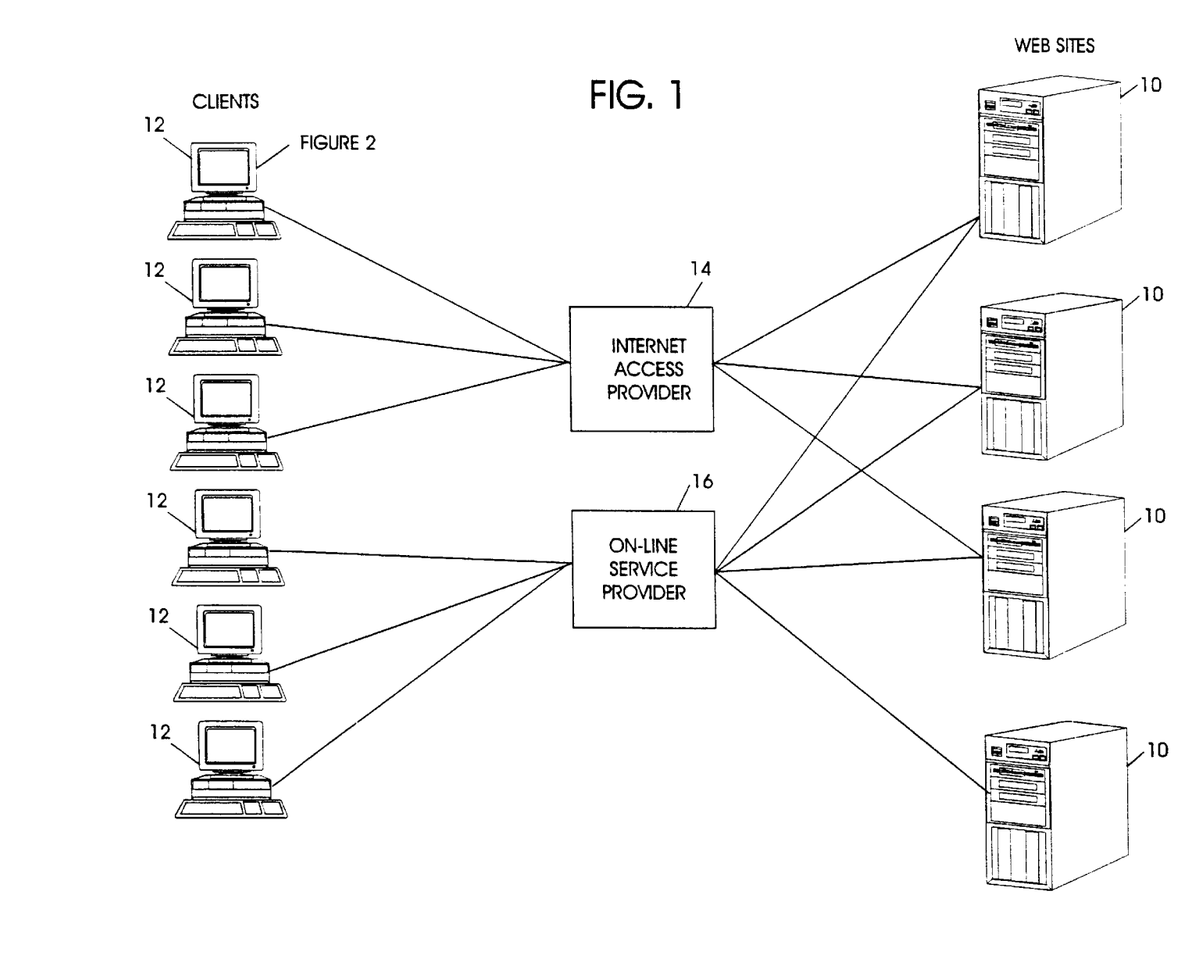

FIG. 1 illustrates a conceptual model for a computer network which is based on a client-server model. Other well-known computer networks based on this client-server model include the Internet. Conceptually, the Internet comprises a large network of servers 10 which are accessible by a plurality of clients 12. Typically, each of the plurality of clients 12 is a personal computer. Each of the plurality of clients 12 communicates with the large network of servers 10 through a private Internet access provider 14, such as Internet America, or an on-line service provider 16, such as America On-Line, Prodigy, Compuserve, the Microsoft Network, and the like. Each of the plurality of clients 12 may run a "browser" or a "navigator," which are known software tools used to access the network of servers 10 via a desired access provider (14 or 16). In this computer network, the network of servers 10 operate "websites" which support files in the form of documents and pages. A network path to a server 10 is identified by a uniform resource locator or URL, having a known syntax for defining a network connection.

As previously mentioned, The "World Wide Web" (WWW) is that collection of servers in the Internet communication network that utilize the Hypertext Transfer Protocol (HTTP). HTTP is an application protocol that provides users access to files using a standard page description language known as Hypertext Markup Language (HTML). The files which are accessed may be in many different formats, such as text, graphics, images, sound, and video, among others. HTML provides basic document formatting and allows a developer to specify "links" to other URL's. Use of an HTML-compliant client browser involves specification of a link via the URL. Upon such specification, the client makes a request to the server identified in the link and receives a "web page" in return. It should be noted that the "web page" is a document formatted according to HTML.

The present invention provides a voice command interface which allows a user to merely speak a name of a link to receive a desired web page. Before operation of the present invention is described in greater detail, it should be noted that in the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Additionally, for the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
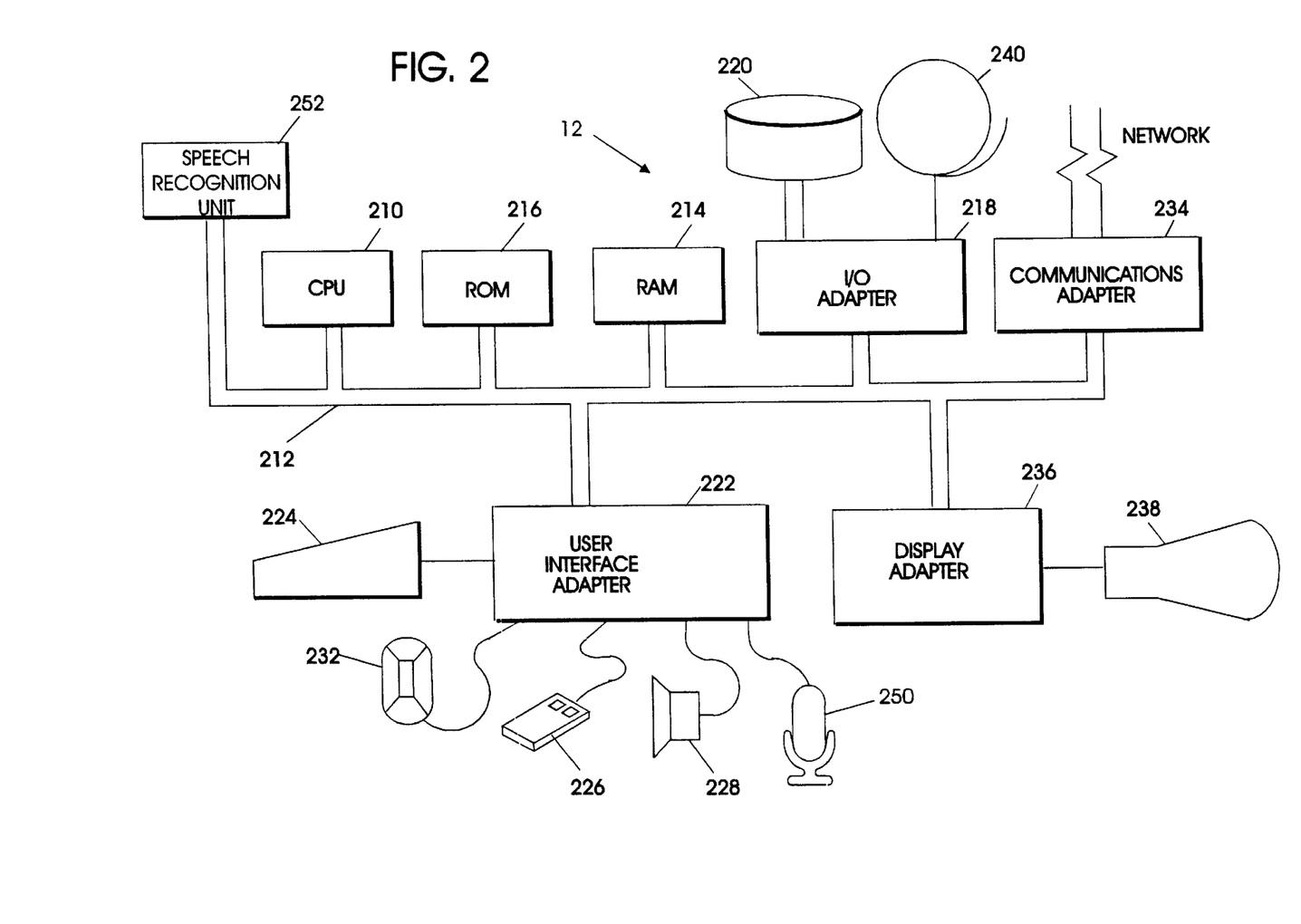

FIG. 2 illustrates a block diagram of a representative client computer 12 in which the present invention is implemented. The system has a central processing unit (CPU) 210, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. It should be noted that other central processing units may be implemented in client computer 12. The history buffer (not shown) of the present invention is included in CPU 210. The CPU 210 is coupled to various other components by system bus 212. Similarly, speech recognition unit 252 is coupled to various other components of data processing system 12 by system bus 212. Read only memory ("ROM") 216 is coupled to the system bus 212 and includes a basic input/output system ("BIOS") that controls certain basic functions of the data processing system 12. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226, speaker 228, and microphone 250 are all interconnected to bus 212 via user interface adapter 222. It should be noted that user interface adapter 222 may be partially implemented as an audio card in one embodiment of the present invention. Display monitor 238 is connected to system bus 212 by display adapter 236. In this manner, a user is capable of inputting to the system through keyboard 224, trackball 232, mouse 226, or microphone 250 and receiving output from the system via speaker 228 and display 238. Additionally, an operating system such as AIX ("AIX" is a trademark of the IBM Corporation) is used to coordinate the functions of the various components shown in FIG. 2. Other operating systems which may be utilized to coordinate the various functions of the components illustrated in FIG. 2 may be DOS, Windows 3.x, Windows '95, OS/2, or any other known and available operating system.

As client computer 12 interacts with a computer network referred to as the Internet, various tools for accessing the Internet are also implemented within RAM 214. Such Internet access tools include a HTTP-compliant web browser. Such browser software includes Netscape, Netscape Navigator 2.0, Mosaic, IBM WebExplorer, Internet Explorer, and other such commercially available browser packages. The present invention is designed to operate within any of these known or developing web browsers. RAM 214 may also support other Internet services including simple mail transfer protocol (SMTP) or e-mail, file transfer protocol (FTP), network news transfer protocol (NNTP) or "News net," and remote terminal access (Telnet).

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

During a following description of operation, speech recognition unit 252 will be referred to often. A more detailed description of speech recognition unit 252 will not be provided herein as such units are well-known in the relevant data processing art. For information regarding speech recognition unit 252, refer to U.S. Pat. No. 5,465,317, entitled "Speech Recognition System With Improved Rejection of Words and Sounds Not In The System Vocabulary," by Edward A. Epstein, et al., which is hereby incorporated by reference herein.

Figure 3:
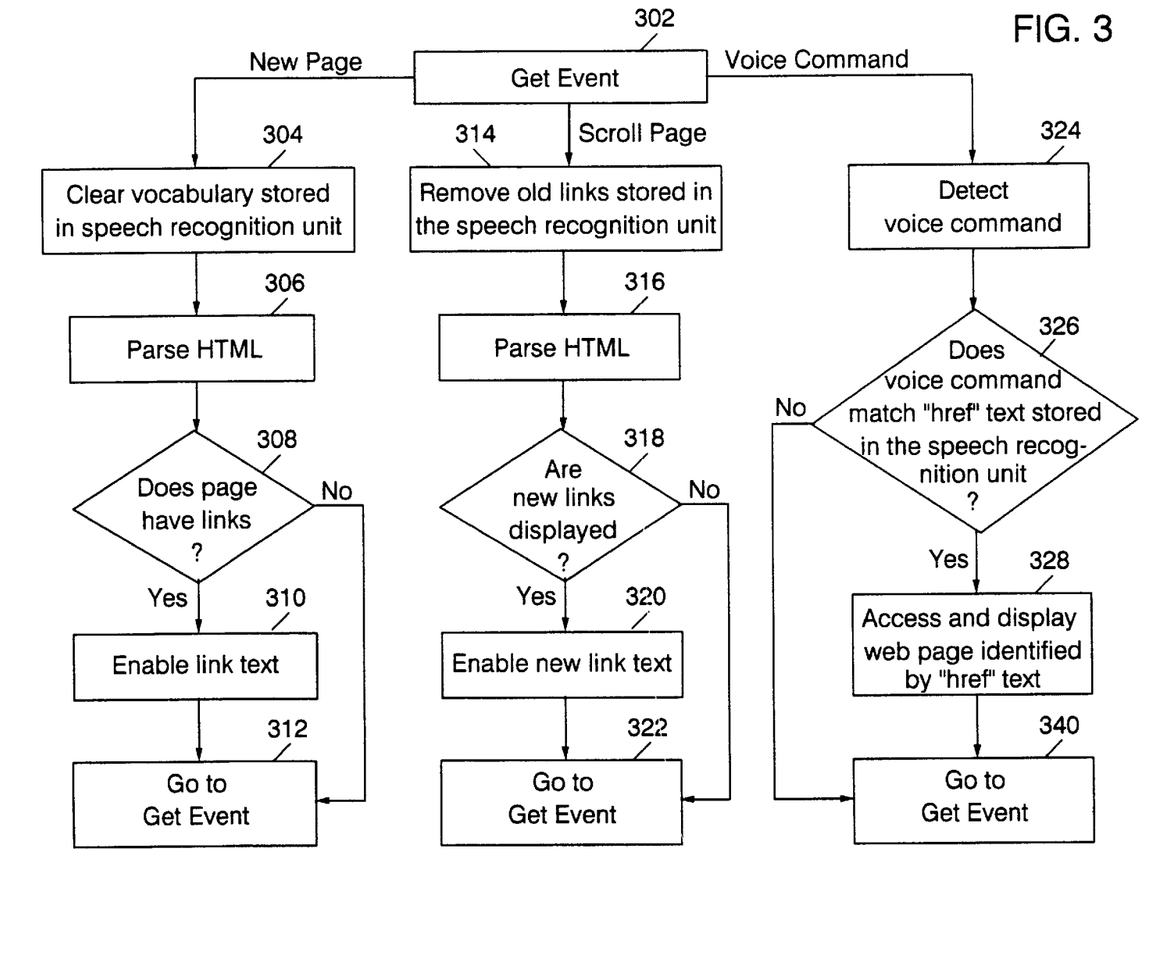

The use of one of the plurality of clients 12, also referred to as client computer 12, to execute the operations of the present invention will subsequently be described with reference to FIG. 3. In a methodology illustrated in FIG. 3, a current web page is displayed on the graphical user interface of the client computer 12 at a step 302. It should be noted that accessing the current web page and displaying the same on display device (138) of a client computer 12 is well-known in the data processing art and will not be described in detail herein. After the web page is displayed on a display device 138 of client computer 12, client computer 12 enables user interface adapter 222 to detect any inputs from an external user. The external user may access a new web page from a server 10 or scroll down the web page by clicking a button on mouse 226, positioning and enabling trackball 232, or pressing certain keys on keyboard 224.

When an external user accesses a new web page, CPU 210 provides control signals to speech recognition unit 252 to clear a vocabulary list stored therein in a step 304. The vocabulary list stored in speech recognition unit 252 provides a list of all words and utterances by an external user which will be recognized as voice commands when input to microphone 250, processed through user interface adapter 222, and received by speech recognition unit 252.

Subsequently, CPU 210 commences to parse the HTML source code corresponding to the accessed web page in a step 306. In performing the parsing operation, CPU 210 relies upon the formatting associated with HTML. This formatting will be described below.

Hypertext mark-up language uses "tags," denoted by the "< >" symbols, with the actual tag between the brackets. Most tags have a beginning (<tag>) and an ending section, with the end shown by a slash symbol (</ tag>). There are numerous link tags in HTML to enable a viewer of the document to jump to another place in the same document, to jump to the top of another document, to jump to a specific place in another document, or to create and jump to a remote link, via a new URL, to another server. To designate a link, such as that previously referred to, HTML typically uses a tag having a form of, "<A HREF=/XX.HTML>YY</A>," where XX indicates a URL and YY indicates text which is inserted on the web page in place of the address. Specifically, a link is designated by the HREF term included in the tag. In response to this designation, a browser within client computer 12 will display a link in a different color or with an underscore to indicate that a user may point and click on the text displayed and associated with the link to download the link. At this point, the link is then said to be "activated" and a browser within client computer 12 begins downloading a linked document or text.

After CPU 210 parses the HTML corresponding to the accessed web page, CPU 210 determines whether the accessed web page has any links therein in a step 308. If not, the program flow is returned to step 302. However, if the web page does have links, CPU 210 detects those links during a parsing operation and enables speech recognition unit 252 to store the text displayed on display device 238 which corresponds to the link in a special vocabulary list of the speech recognition unit in a step 310. When the text associated with a link is included within a list of words which speech recognition unit 252 recognizes, the link text is enabled and placed within the vocabulary list in a step 310. Subsequently, a program flow returns to step 302.

If a user does not change to a new web page, but merely scrolls through a page currently displayed on display device 238 of client computer 12, speech recognition unit 252 removes language associated with old links displayed before the page was scrolled from its vocabulary list in a step 314. Furthermore, it should be noted that similar functions are executed when a window displaying text is resized to display more or less text, and probably more or less links.

Subsequently, CPU 210 parses the newly scrolled portion of the web page in a step 316. Subsequently, in a step 318, CPU 210 uses the tags and references previously described with respect to HTML to determine whether any new links are displayed in the scrolled portion of the web page. If not, a program flow returns to a step 302. If new links are displayed, speech recognition unit 252 stores the text associated with the link in a vocabulary list. As previously described, when the text storing the vocabulary list corresponds to words already "known" by speech recognition unit 252, speech recognition unit 252 enables the new link text such that it may be recognized when a user speaks a voice command accessing such link text. Additionally, in an alternate embodiment of the present invention, old links stored in speech recognition unit 252 may be retained for a preselected portion of time.

Next, in a step 324, client computer 12 detects when an external user utters a word or sound. The word is transferred from microphone 250 to user interface adapter 222. Under control from CPU 210, the word is passed from user interface adapter 222 to speech recognition unit 252. Speech recognition unit 252 subsequently determines text corresponding to the word or phrase in a step 326. Speech recognition unit 252 performs this function by matching the text corresponding to the HREF or link text stored within the vocabulary list of speech recognition unit 252. If the voice command is not within the vocabulary list, speech recognition unit 152 indicates that the word is not included in its vocabulary and subsequently waits for a next user action as program flow is returned to step 302. If the voice command does match a word or phrase in the vocabulary list of speech recognition unit 252, the word is used to access a corresponding web page. Subsequently, CPU 210 uses the web page address to access the web page from a designated server 10 in a step 328.

While operation of the present invention has been described utilizing the system diagrams of FIG. 1 and FIG. 2, and the flow chart of FIG. 3, examples of operation of the present invention will subsequently be provided.

Assume that a user accesses an IBM patent home page available on the Internet at "http://patent.womplex.ibm.com/ ibm.html." To access such a web page, a web browser running from RAM 214 of client computer 12 uses a tcp/ip connection to pass a request to a web server 10 running an HTTP service (under the WINDOWS Operating System) or "daemon" (under a UNIX operating system). A HTTP server (10) then services the request by sending a web page formatted in HTML to the browser. The browser then displays the web page using local resources. It should be noted that the request for a web page may be made by a voice command using the OS/2 operating system available from International Business Machines Corporation or by traditional input techniques, such as keyboard 224 or mouse 226 (of FIG. 2). Furthermore, it should be noted that the use of the OS/2 operating system is provided as an example only. It should be noted that the server operating systems may be any system which implements the HTTP protocol.

Figure 4:
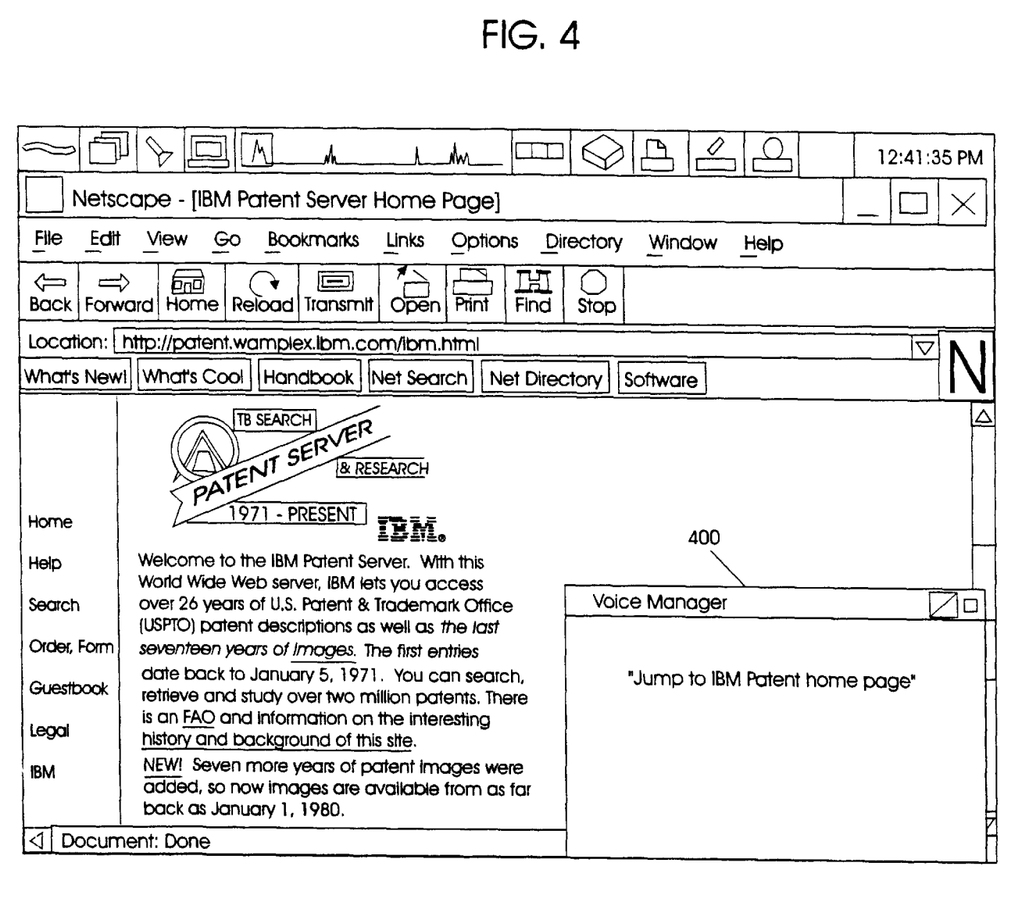

FIG. 4 illustrates a web page as displayed on display device 238 of FIG. 2. It should be noted that on display device 238, a voice manager window 400 is provided to indicate a vocal input provided to microphone 250 of client computer 12. In FIG. 4, voice manager 400 indicates that a user spoke a command "Jump to IBM Patent home page." Thus, assuming that client computer 12 operates under a OS/2 operating system or another operating system which implements or accesses a speech recognition unit, voice commands may be implemented to jump to specific web pages whose Internet addresses have been previously defined and stored within a memory of client computer 12. Note that in FIG. 4 several "links" are illustrated. The links are designated by being underlined. Furthermore, it should be noted that FIG. 4 corresponds to steps 302 and 304 of FIG. 3.

Figure 5A:
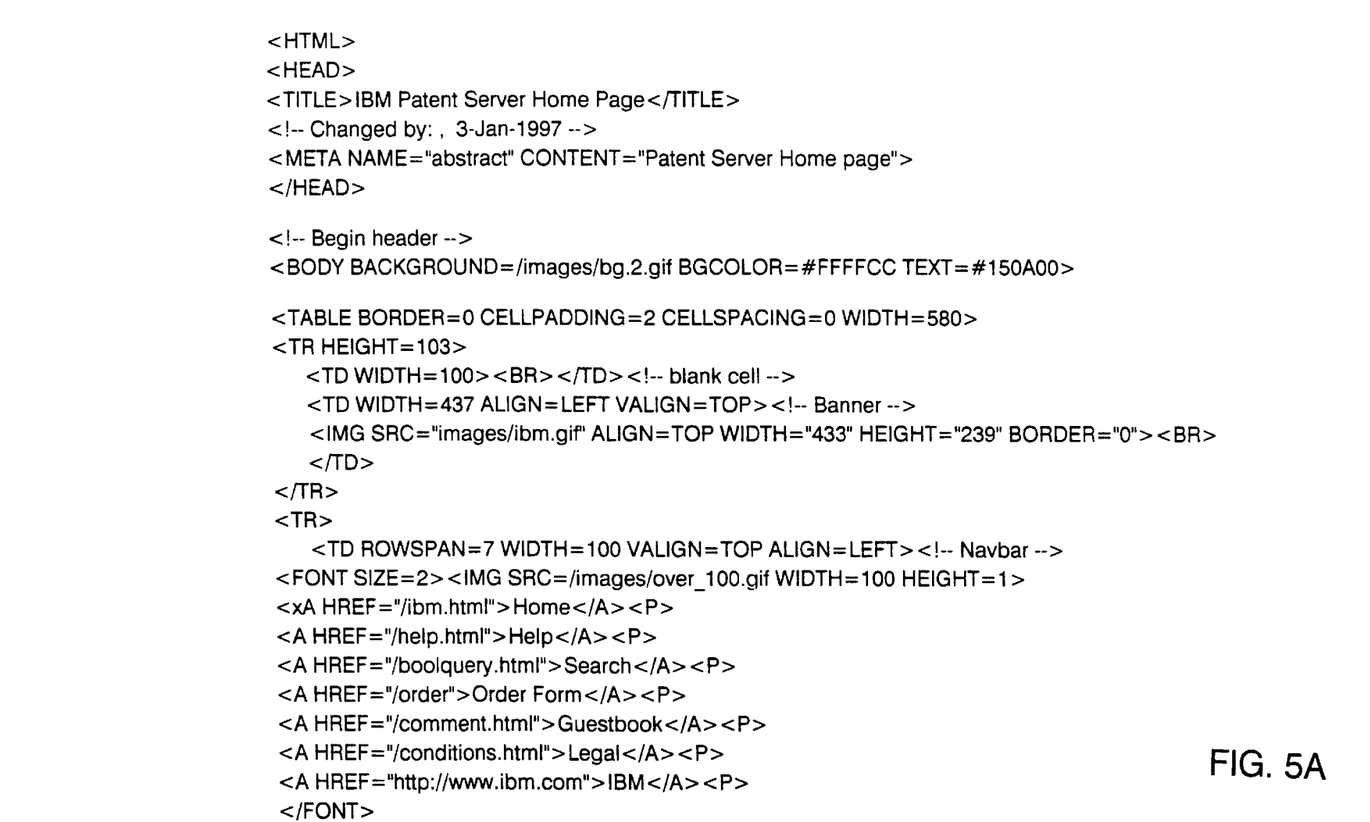
Figure 5B:
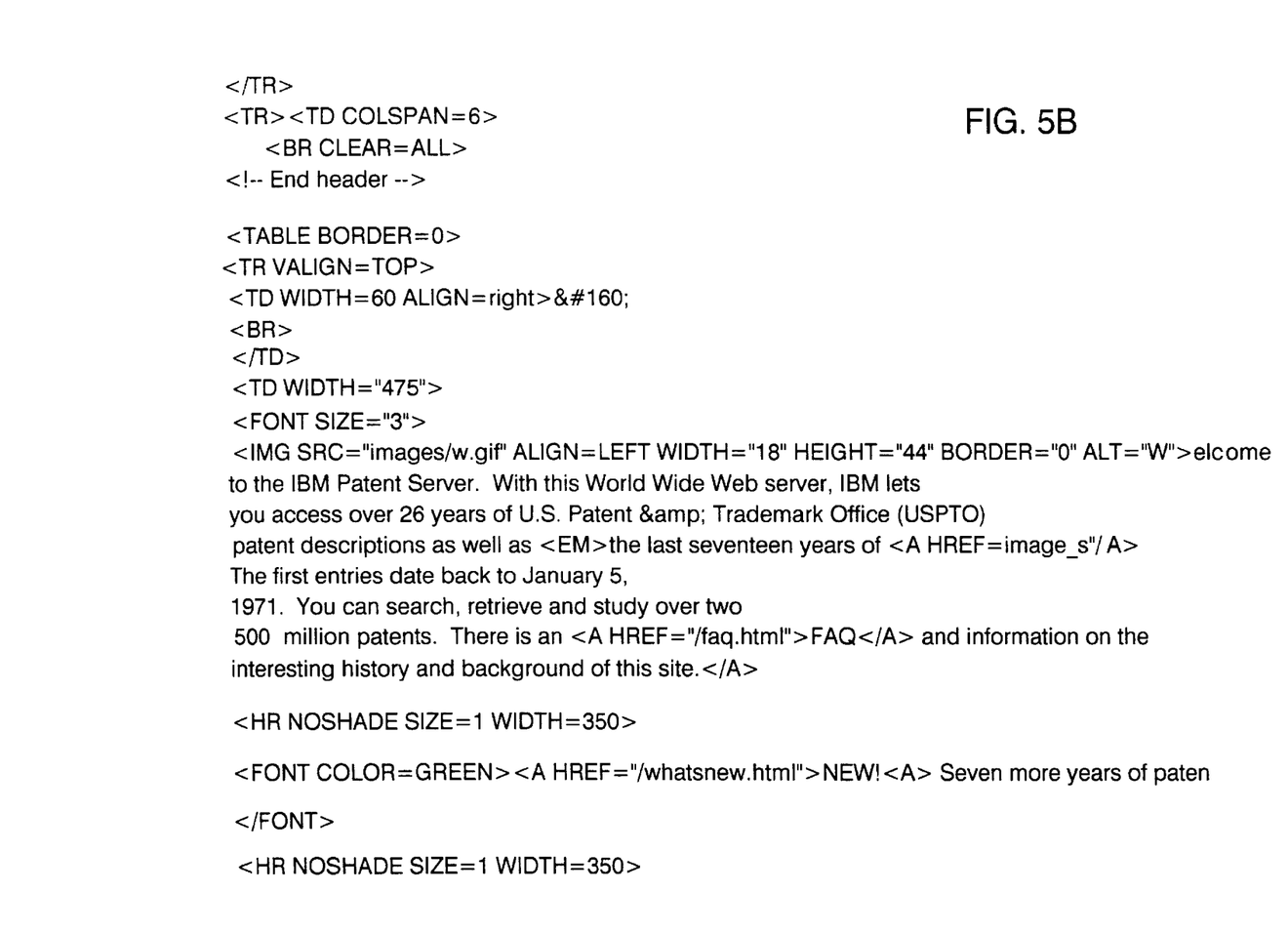

Next, the HTML source code used to generate the web page in FIG. 4 is illustrated in FIG. 5. In a line 500, note that the HTML source code indicates a link exists for the terms "images," "FAQ," and "history and background of this site." As previously mentioned, these links are designated by the term HREF before the previously identified terms. Thus, when client computer 12 receives the HTML source code which may be used to generate the web page in FIG. 4, CPU 210 will detect a tag having a form "<A HREF= . . . > IBM</A>," which is generally referred to as an anchor tag. Next, CPU 210 executes steps 308–312 to identify the language associated with the HREF tags and to determine whether that language corresponds to words which are recognizable by speech recognition unit 252.

Figure 6:
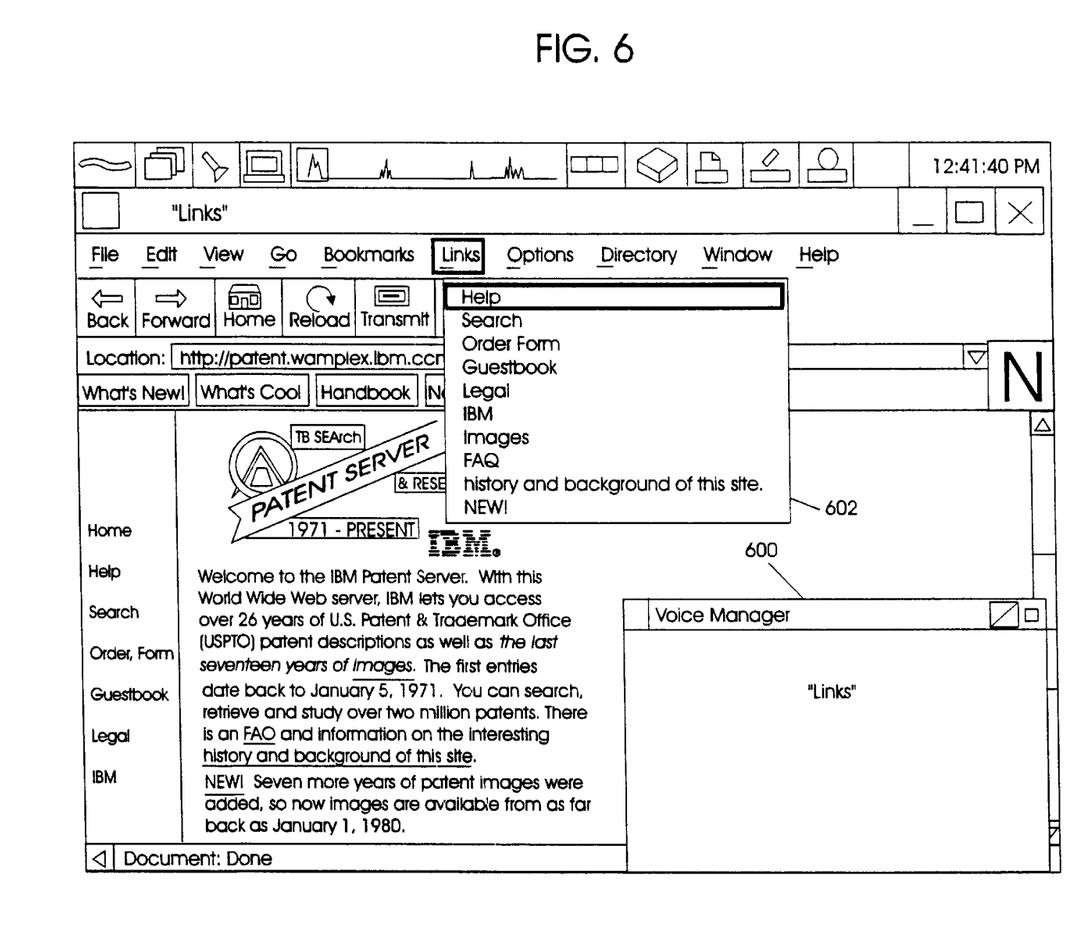

Subsequently, assume that a user speaks a "links" voice command. The "links" command accesses a link menu on a top bar of a window displayed on display device 138 (as illustrated in FIG. 6). Because client computer 12 is responding to a voice command, a voice manager window 600 indicates that a links command was received and recognized. Furthermore, the links command has been updated to reveal only those terms which are designated as links in the web page of FIG. 6. When the illustrated text is referred to, links corresponding to "images," "FAQ," "history and background of this site," and "NEW!" are identified.

Figure 7:
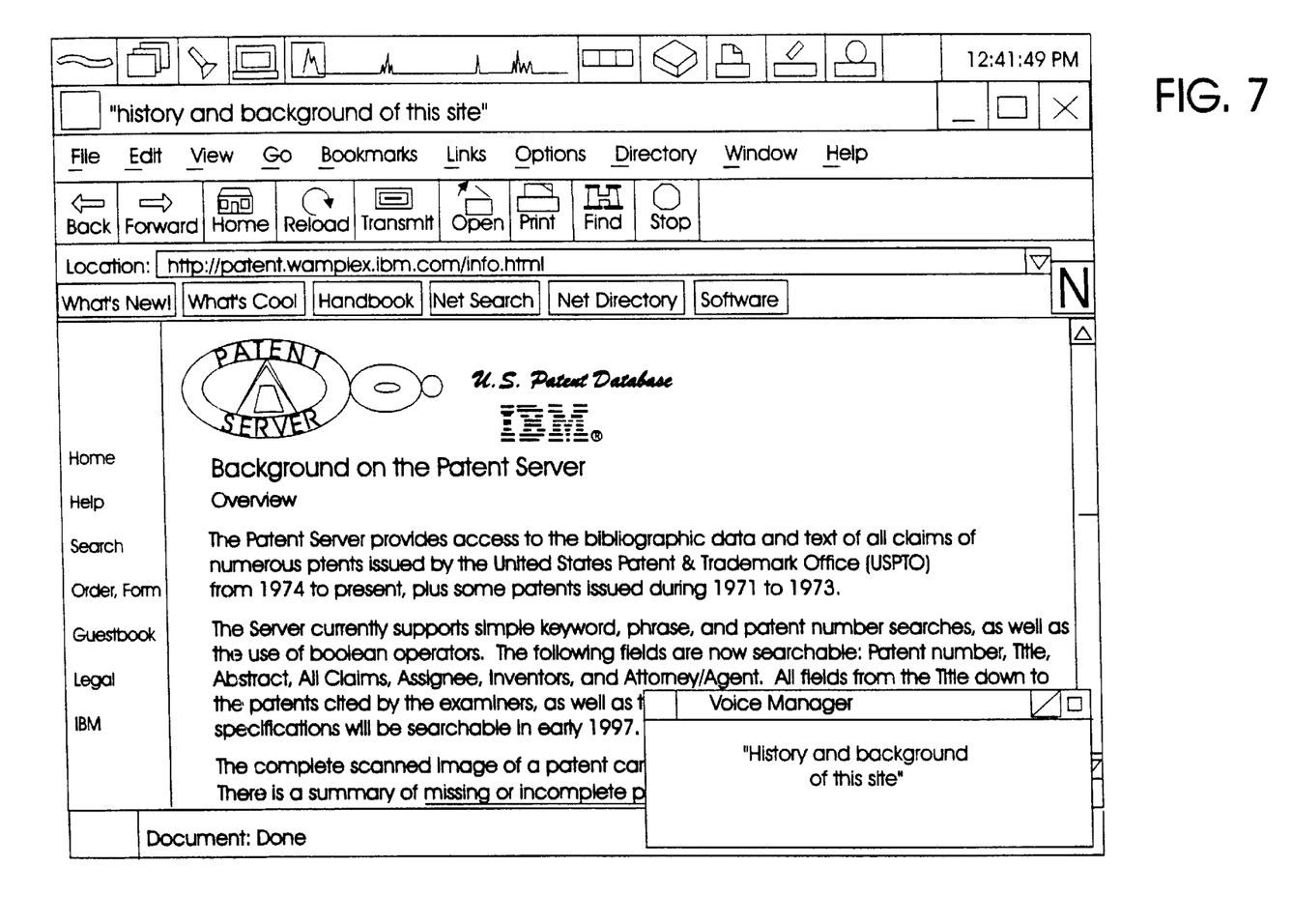

Next, assume that a speaker voices a command "history and background of this site" to access a web site associated with that text. In this case, client computer 12 detects a voice command in step 324. Subsequently, CPU 210 and speech recognition unit 252 determines whether the detected words or phrases provided by the external user match text associated with links in a vocabulary list of speech recognition unit 252. Because this term was revealed within the links menu and is recognizable by speech recognition unit 252, speech recognition unit 252 provides an Internet address corresponding to this link. In this instance, the Internet address is "http://patent.womplex.ibm.com/info.html." In response to this request, server 10 of the computer network responds by sending a web page corresponding to this address. The web page is sent to the browser of client computer 12 where it is displayed on display device 138. FIG. 7 illustrates a resulting display on display device 138. Note that a voice manager window indicates that the speech recognition unit 252 did recognize the phrase "history and background of this site."

Figure 8:
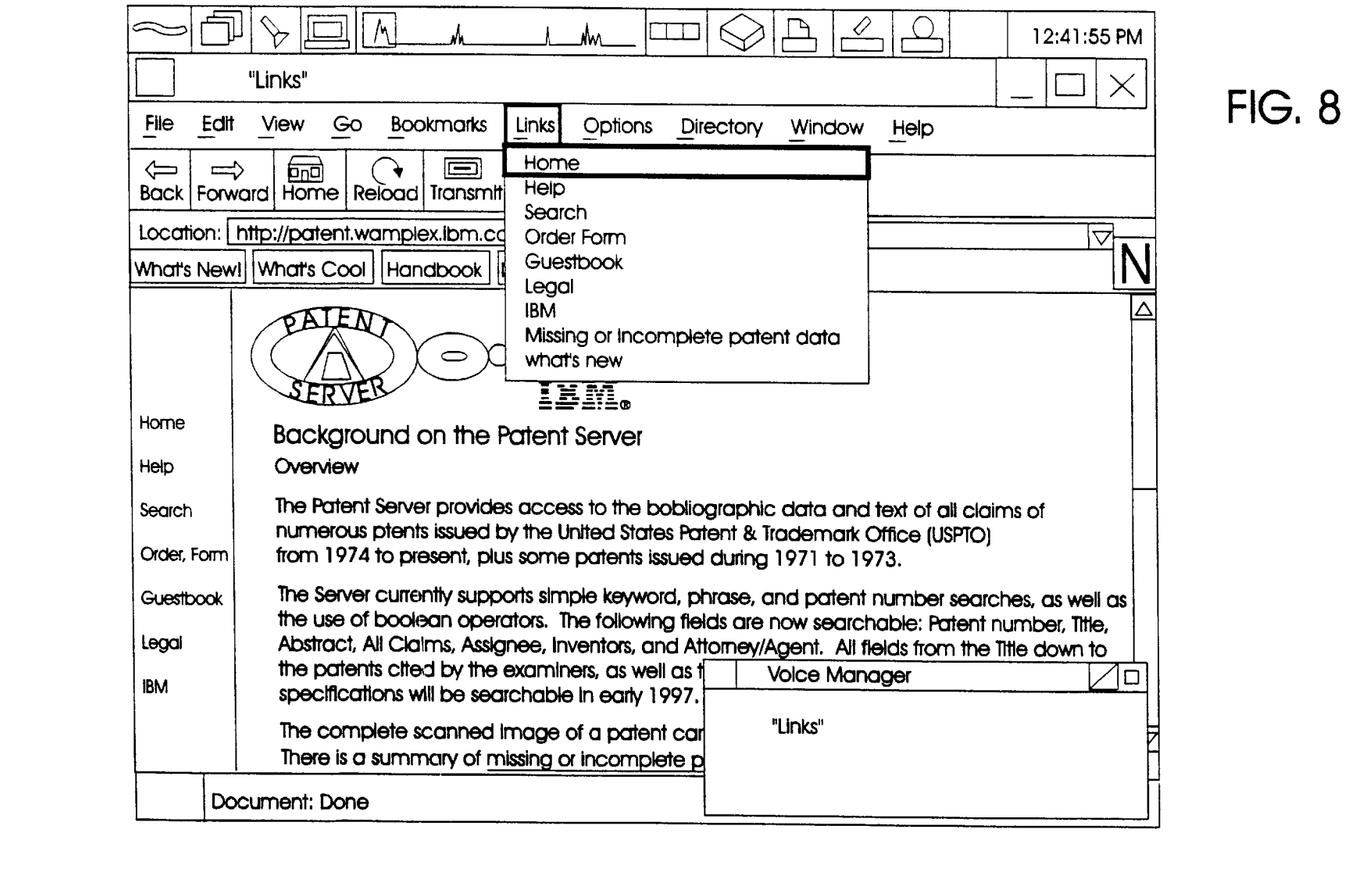

When an external user desires to see the links associated with the new web page of FIG. 7, the use must merely speak the command "links." In response to this command, a links menu is displayed. From the links menu of FIG. 8, it may be observed that a previous links menu displayed on FIG. 6 has been modified to display only those links associated with the web page currently being displayed. Therefore, the links "missing or incomplete patent data" and "what's new" are displayed on the links menu in place of the previously defined links. Again, when the new web page is accessed, steps 304–312 of FIG. 3 are performed to ensure that a vocabulary list and a links menu corresponding to the web page are updated in an appropriate manner.

In a second example, an IBM WebExplorer browser is used to implement the present invention. It should be noted that a Netscape browser was utilized to access the desired web pages in the examples illustrated in FIGS. 4–8. While most of the operations executed by the web browsers appear to perform the same functions to an external user viewing a web page, each browser may perform different operations to display the web page to the external user.

Figure 9:
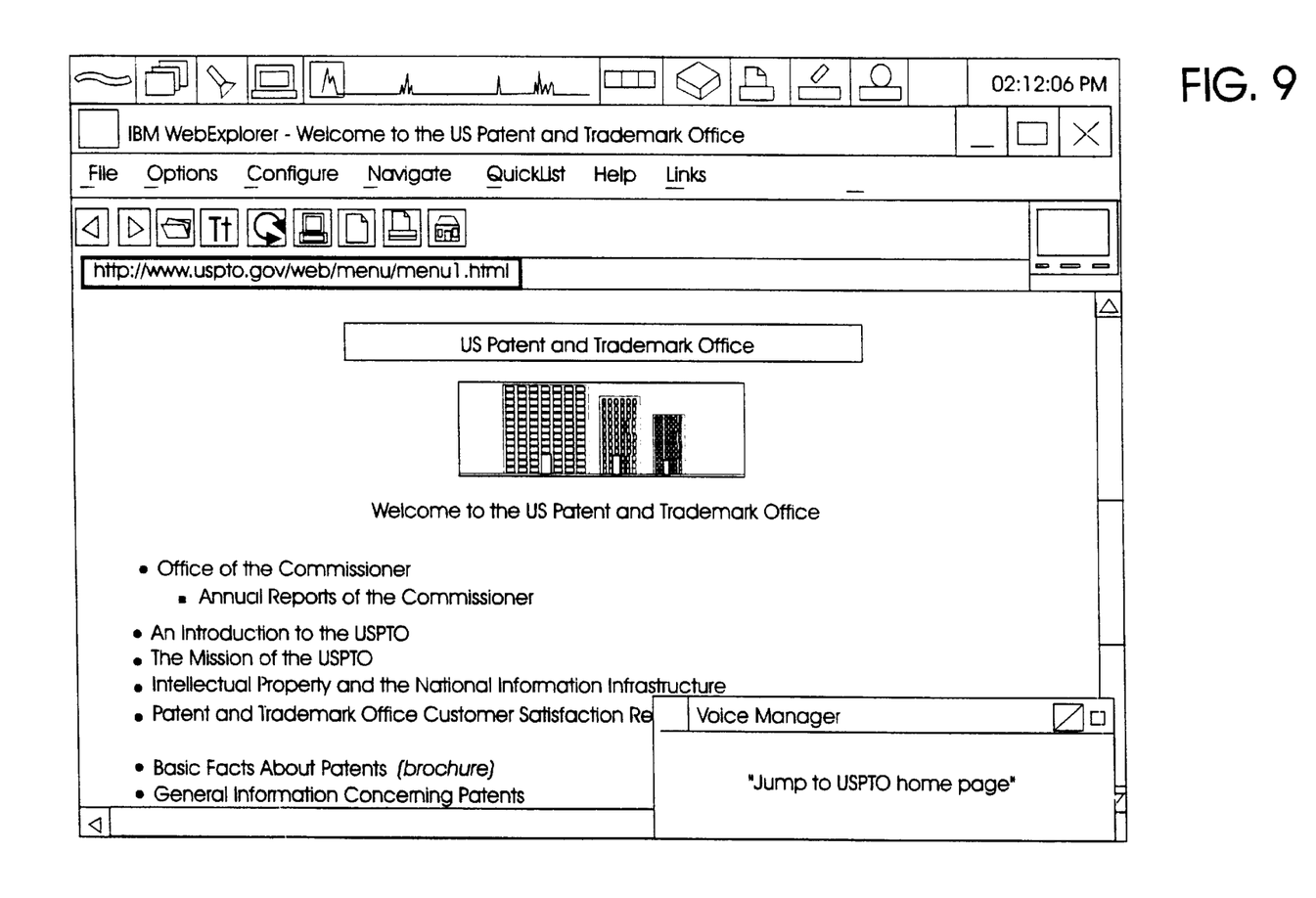

FIG. 9 illustrates a web page accessed by an external user executing a "Jump to USPTO home page" command. As previously mentioned, this command may be provided via a voice interface or another form of graphical user interface implemented by the user. It should be noted that the USPTO home page may be accessed at Internet address "http://www.uspto.gov/web/menu/menu1.html."

Figure 10:
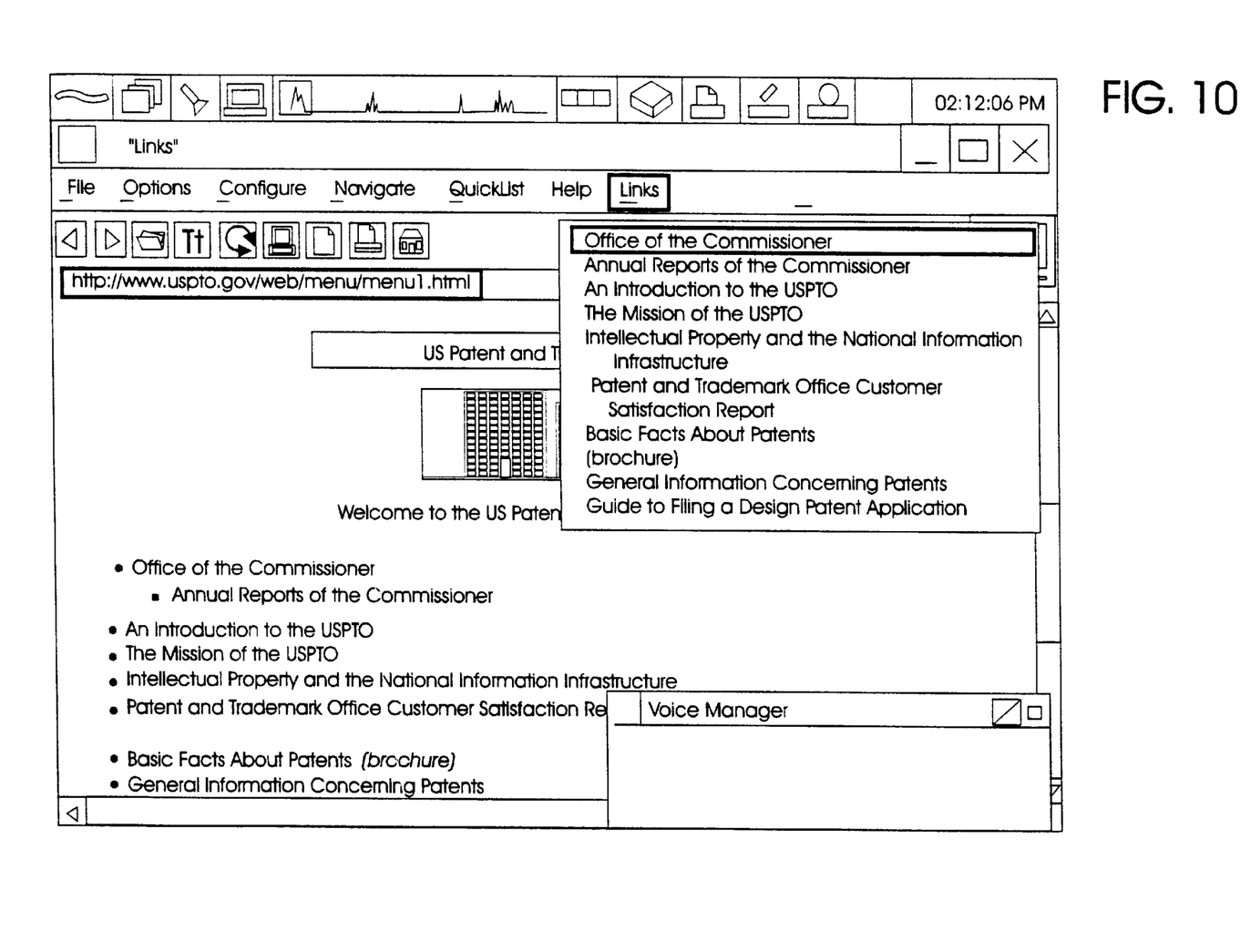
Figure 11:
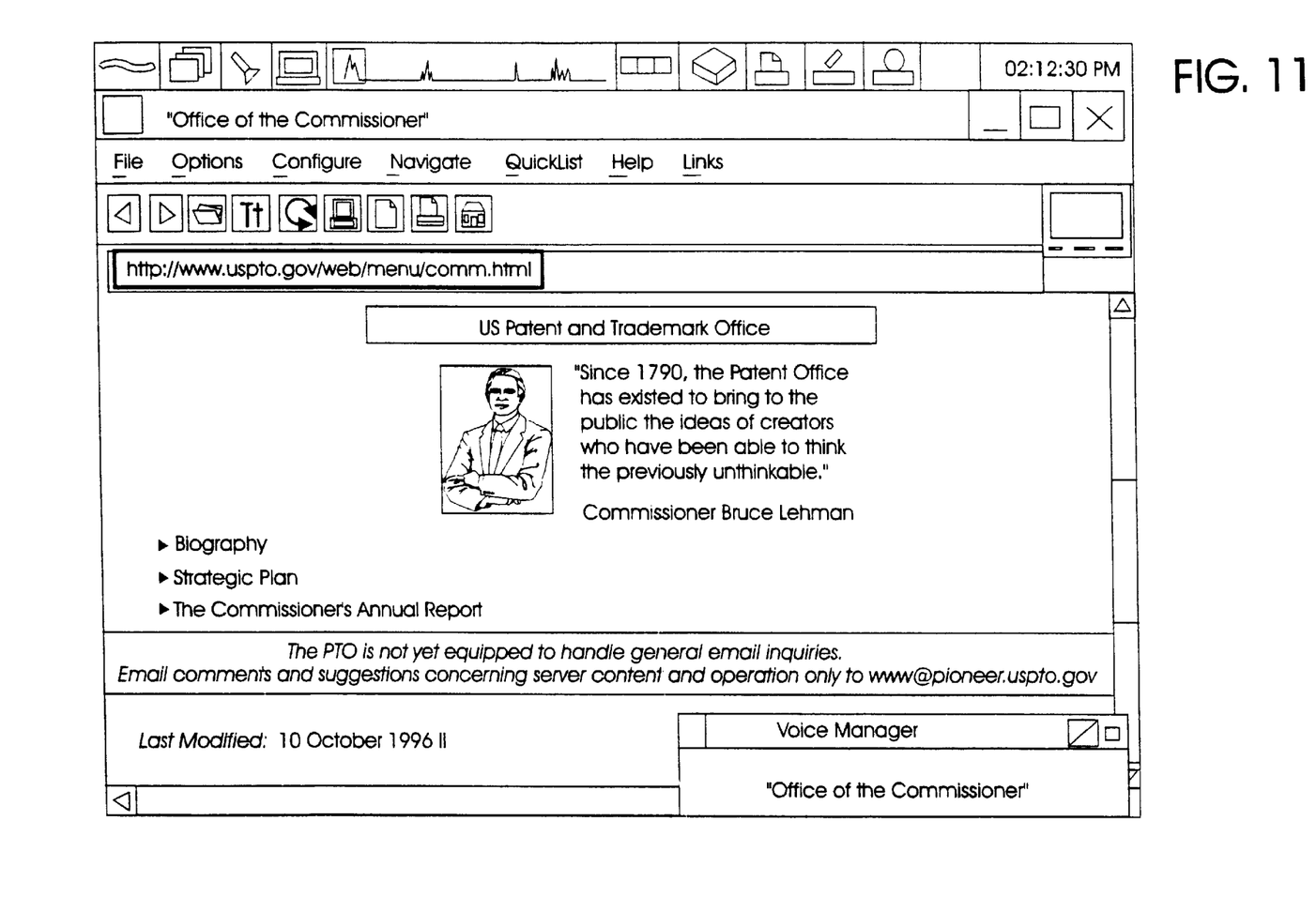
Figure 12:
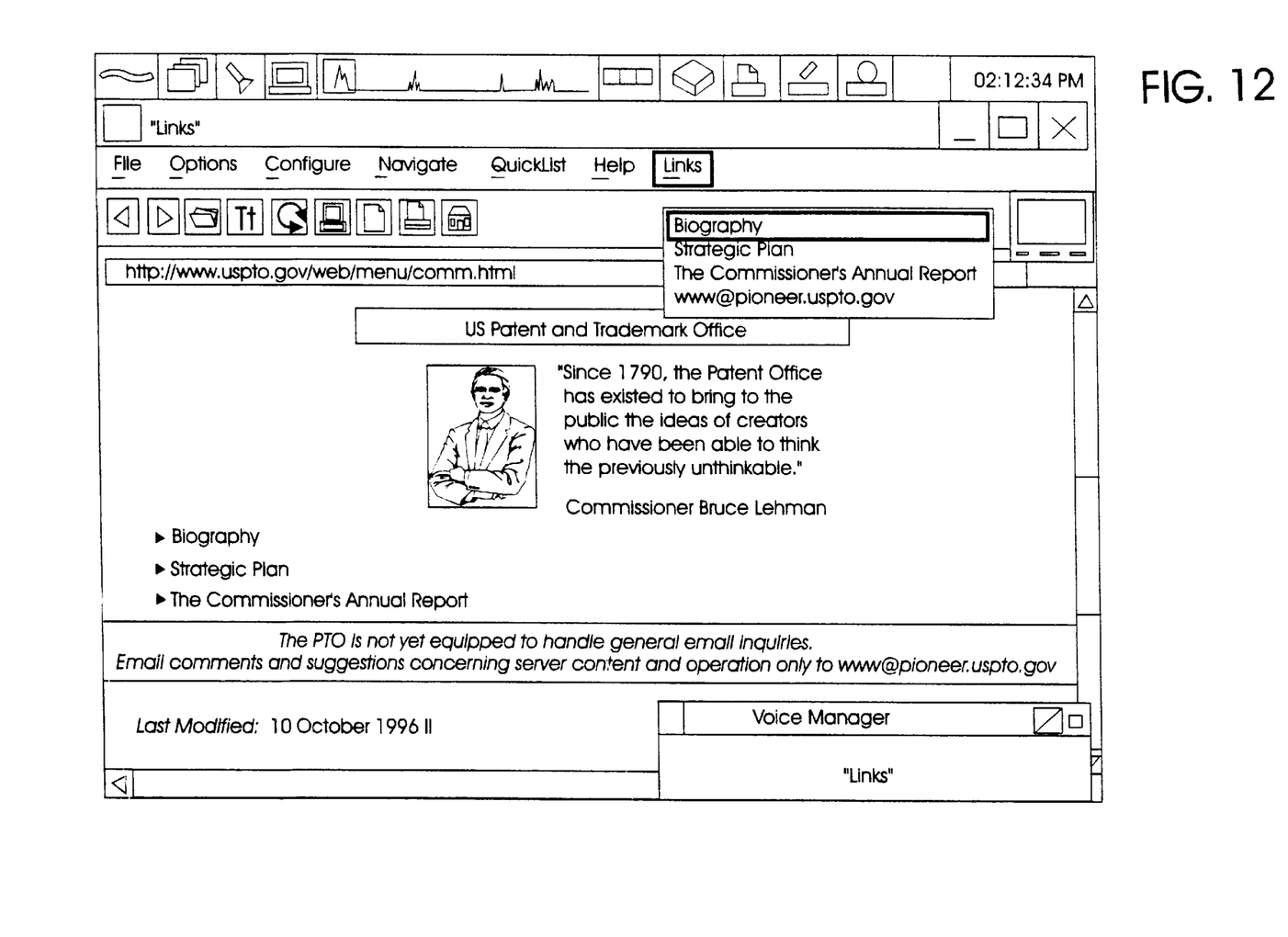

FIG. 10 illustrates a links menu corresponding to the USPTO home page displayed in FIG. 9. It should be noted that the links correspond to the new home page accessed by the user's instruction to jump to the USPTO home page. Subsequently, when a user speaks a command to view the office of the commissioner, which is a link defined in the web page of FIG. 9 and displayed in the link menu of FIG. 10, a web page having an Internet address of "http://www.uspto.gov/web/menu/comm.html" is accessed. This web page is illustrated in FIG. 11. Subsequently, FIG. 12 illustrates a links menu which corresponds to the newly accessed web page which was accessed in response to a voice command of an external user.

Through each of the examples described herein, the present invention implements a methodology which allows a user to provide voice commands to access links specified on a web page. Although the invention has been described in terms of a preferred embodiment, those skilled in the art will recognize that various modifications of the invention can be practice within the scope and spirit of the appended claims. Thus, for example, while it is envisioned that the hypertext document, associated with the web page link, is located on a remote server, this is not a limitation of the invention. Rather, the use of voice commands to access links may be provided regardless of a location of a target document. Also, while the preferred embodiment has been described in the context of an Internet browser, the techniques of the invention apply whether or not a user accesses the World Wide Web via a direct Internet connection or indirectly through some on-line service provider. Thus, the computer network in which the invention is implemented should be broadly construed to include any client-sever model from which a client can link to a "remote" document, even if that document is available on the same machine or system. Furthermore, in an implementation of the browser of the present invention, the browser is implemented as a set of instructions in a code module resident in a random access memory of the user's personal computer. Until required by the computer, the set of instructions may be stored in another computer memory, for example, in a hard disk drive, or in a removable memory such as an optical disk (for eventual use in a CD-ROM), or floppy disk (for eventual use in a floppy disk drive). In addition, although the various methods described are conveniently implemented in a general purpose computer selectively activated or reconfigured by software, one of ordinary skill in the art would recognize that such methods may be carried out in hardware, in firmware, or in more specialized apparatus constructed to perform the required method steps.

Additionally, the present invention is designed to be implemented with conventional HTML and enhancements thereto, by an HTML compliant browser, such as Netscape, Netscape Navigator 2.0, Mosaic, and Internet Explorer, as such existing or developed programs are modified to include the functionality of the invention described above.

While there have been described herein the principles of the invention, it is to be clearly understood to those skilled in the art that this description is made by way of example only and not as a limit to the scope of the invention. Accordingly, it is intended, by the appended claims, to cover all modifications of the invention which fall within the true spirit and scope of the invention.

What is claimed is:

1. A data processing system, comprising:
   a first input means for receiving a first user input;
   a second input means for receiving a first voice command;
   a central processing unit coupled to the first input means for receiving the first user input, the centrla processing unit performing a first operating in response to the first user input and identifying a first link value corresponding to the first user input; and
   a speech recognition unit coupled to the central processing unit for accessing the first link value and storing the first link value in a first memory, the speech recognition unit coupled to the second input means for receiving the first voice command, the speech recognition unit determining when the first voice command corresponds to the first link value; and wherein said central processing unit inserts the first link in a list of links, said list of links being accessible in response to a second voice command.

2. The data processing system of claim 1 wherein the central processing unit performs a second operation when the speech recognition unit determines that the first voice command corresponds to the first link value.

3. The data processing system of claim 2 wherein the first operation accesses a first application corresponding to the first user input.

4. The data processing system of claim 3 wherein the second operation accesses a second application.

5. The data processing system of claim 4 wherein the second application corresponds to the first link value.

6. The data processing system of claim 1 wherein the first user input is a first portion of software corresponding to a first page of information at a first internet address.

7. The data processing system of claim 6 wherein the first portion of software is written in hyper-text mark-up language.

8. The data processing system of claim 7 wherein the first link is identified by an indicator in hyper-text mark-up language.

9. The data processing system of claim 6 wherein the first link indicates a second internet address.

10. The data processing system of claim 9 wherein the central processing unit provides a plurality of control signals to access the second internet address when the first voice command corresponds to the first link.

11. The data processing system of claim 6, further comprising:
    a third input means for receiving a third user input, wherein the central processing unit accesses a second portion of software corresponding to a second page of information at the first internet address.

12. The data processing system of claim 11, wherein the central processing unit identifies a second link value corresponding to the third user input.

13. The data processing system of claim 12, wherein the speech recognition unit accesses the second link value and stores the second link value in a second memory, the speech recognition unit determining when a third voice command corresponds to the second link value.

14. The data processing system of claim 13 wherein the first link value is removed from the first memory when the second link value is stored in the second memory at a predetermined time.

15. A method for accessing a communication network, comprising the steps of:
    receiving a first user input at a first user interface;
    enabling a central processing unit to access a first application comprising a first text portion in response to the first user input;
    parsing the first text portion to identify a first link corresponding to a second application;
    receiving a first voice command at a second user interface;
    enabling a speech recognition unit to recognize the first voice command and to determine when the first voice command corresponds to the first link; and
    inserting the first link in a list of links, said list of links being accessed in response to a second voice command.

16. The method of claim 15, further comprising the step of:
    enabling the central processing unit to access a second application when the first voice command corresponds to the first link.

17. The method of claim 16 wherein the first user input is a first portion of software corresponding to a first page of information at a first internet address.

18. The method of claim 17, further comprising the step of:
    receiving a second portion of software corresponding to a second page of information at a second internet address when the central processing unit accesses the second application.

19. The method of claim 18 wherein the first link corresponds to the second internet address.

20. The method of claim 17, further comprising the steps of:
    receiving a third user input at a third user interface; and
    enabling the central processing unit to access a second portion of software corresponding to a second page of information at the first internet address.

21. The method of claim 20, further comprising the step of:

identifying a second link from the second portion of software.

22. The method of claim 21, further comprising the steps of:

enabling the speech recognition unit to access the second link;

storing the second link in a second memory; and enabling the speech recognition unit to determine when a third voice command corresponds to the second link.

23. The method of claim 22, further comprising the step of:

removing the first link from the first memory when the second link is stored in the second memory.

24. A program storage device, readable by a machine, tangibly embodying a program of instructions executable by the machine to perform method steps for accessing a data processing system, said method steps comprising:

receiving a first user input at a first user interface;

enabling a central processing unit to access a first application comprising a first text portion in response to the first user input;

parsing the first text portion to identify a first link corresponding to a second application;

receiving a first voice command at a second user interface;

enabling a speech recognition unit to recognize the first voice command and to determine when the first voice command corresponds to the first link; and inserting the first link in a list of links, said list of links being accessed in response to a second voice command.

25. The program storage device of claim 24, wherein the method steps further comprise:

enabling the central processing unit to access a second application when the first voice command corresponds to the first link.

26. The program storage device of claim 25 wherein the first user input is a first portion of software corresponding to a first page of information at a first internet address.

27. The program storage device of claim 26, wherein the method steps further comprise:

receiving a second portion of software corresponding to a second page of information at a second internet address when the central processing unit accesses the second application.

28. The program storage device of claim 27 wherein the first link corresponds to the second internet address.

29. The program storage device of claim 26, wherein the method steps further comprise:

receiving a third user input at a third user interface; and enabling the central processing unit to access a second portion of software corresponding to a second page of information at the first internet address.

30. The program storage device of claim 29, wherein the method steps further comprise:

identifying a second from the second portion of software.

31. The program storage device of claim 30, wherein the method steps further comprise:

enabling the speech recognition unit to access the second link;

storing the second link in a second memory; and enabling the speech recognition unit to determine when a third voice command corresponds to the second link.

32. The program storage device of claim 31, wherein the method steps further comprise:

removing the first link from the first memory when the second link is stored in the second memory.

* * * * *